March 1, 1955 — C. W. GREEN — 2,703,251
CATCH BASIN CLEANER
Filed Sept. 15, 1951
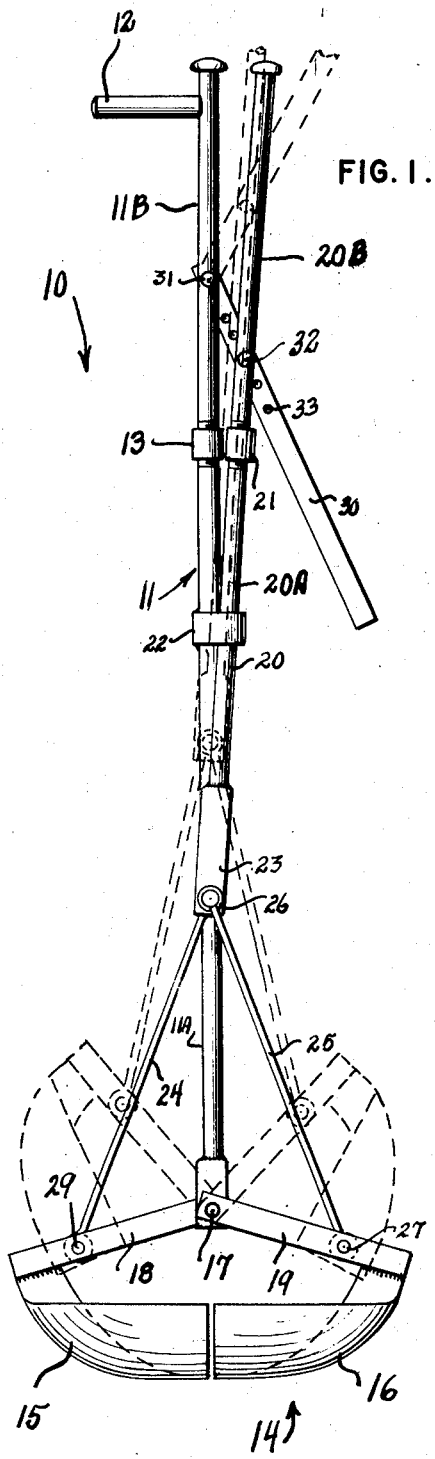
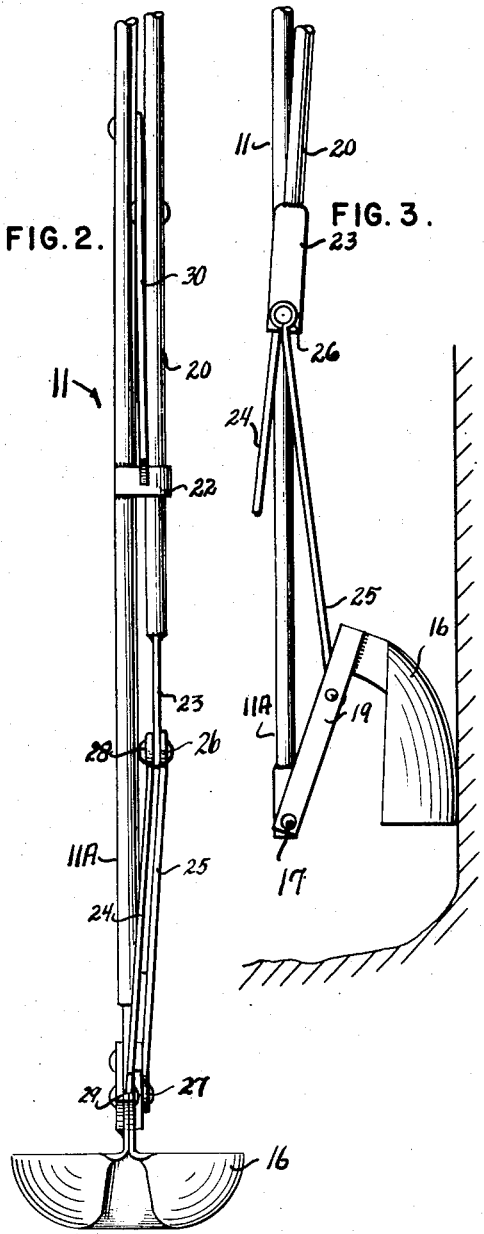
INVENTOR
CLYDE W. GREEN

United States Patent Office 2,703,251
Patented Mar. 1, 1955

2,703,251

CATCH BASIN CLEANER

Clyde W. Green, Forest, Ohio

Application September 15, 1951, Serial No. 246,815

1 Claim. (Cl. 294—50.8)

The present invention relates to cleaning means for basins, and more particularly has reference to a hand operated implement for removing foreign matter from catch basins located in streets, cisterns, etc.

An object of the invention is to provide a catch basin cleaner by means of which it is possible to clean thoroughly right angled corners in the basins or rounded bottom areas.

A further object of the invention is to provide a hand operated implement for removing foreign matter from catch basins wherein the degree of opening movement of the scoop elements of the implement may be regulated within fine limits.

And still a further object of the present invention is to provide a cleaning implement for catch basins and the like, wherein an effective length of the implement can be easily and quickly increased to permit the implement to be used effectively for cleaning basins of different depths below surface level.

To achieve the above and other objects, the invention broadly comprises a principal handle member, to the lower end of which a pair of cooperating scoop elements are pivotally attached for swinging movement about a horizontal axis, an operator element is slidably mounted with respect to the handle member and is operatively connected by means of a pivotal connection to each of the scoop elements, an operating lever is hingedly secured to the handle element and operator, whereby movement of the lever in one direction displaces the operator in a direction to swing the scoop elements about their pivots to the operating position, while movement of the lever in the opposite direction closes the scoop-like elements.

With the foregoing and other objects in view, the invention consists in the details of construction, and in the arrangement and combination of parts to be hereinafter more fully set forth and claimed.

In describing the invention in detail, reference will be had to the accompanying drawings forming part of this application, wherein like characters denote corresponding parts in the several views, and in which:

Figure 1 is a view in side elevation of my novel catch basin cleaner, the full lines depicting the cleaner in the inoperative position, while the broken lines illustrate the operating position.

Figure 2 is an end view of the cleaner shown in Figure 1, and

Figure 3 is a fragmental view in side elevation showing one of the scoop elements in position for cleaning a basin.

As perhaps more clearly shown in Figure 1, the catch basin cleaner indicated generally 10 includes a tubular principal handle portion 11 which is provided with a hand hold 12 in proximity to the upper end thereof for ease in handling or manipulating the cleaner. The tubular handle 11 is preferably sectional and, as shown in Figure 1, includes a lower section 11A, an upper section 11B, and a coupling 13 connecting the sections. It will be appreciated, therefore, that by use of the coupling 13, it is possible to adjust the cleaner at various depths by merely adding or subtracting an extension to the handle.

A bucket 14, which includes complemental scoop-like elements 15 and 16, is adapted to be pivotally connected to the lower end of the handle as at 17 for movement about a horizontal axis. More specifically, the scoop-like elements 15 and 16 are each provided with an angularly disposed arm 18 and 19, the arms being welded or otherwise attached to the scoop elements 15 and 16. The scoop elements when in their closed position (Figure 1) define in effect a clam-shell bucket. An operator rod 20 composed of sections 20A and 20B connected by means of a coupling 21 is slidable longitudinally with respect to the handle 11 and is guided relative thereto by means of a guide 22 secured to the handle 11 intermediate the ends of the handle. The guide is approximately U-shaped and is of such dimensions as to permit the operator rod 20 to move freely with respect to the handle 11. A flattened bar or extension 23 is suitably affixed to the lower end of the operator 20 and links 24 and 25 are respectively pivoted to the bar 23 and to the arms 18 and 19 of the scoop elements 15 and 16, as shown at 26, 27, 28, and 29, respectively. It can be seen, therefore, that if the operator rod 20 is moved upwardly in the direction of the arrow, Figure 1, the scoop-like element 16 will be moved in the same direction about the pivot 17, the length of movement of the operator rod 20 determining the amount of movement of the scoop-like elements 15 and 16.

In order to impart the necessary movement of the rod 20, it will be noted that a lever arm 30 is disposed between the handle and arm 20 and one end of the lever is pivoted to the handle, as shown at 31, while a pivot 32 is provided between the rod 20 and the lever. In order to permit the scoops to be either fully or partially closed, it will be observed that a plurality of apertures 33 are present in the lever and the opening movement can be regulated by the location of the pivot pin 32 in the proper aperture 33.

It can be seen, therefore, from the above description that the present catch basin cleaner is relatively simple both in structural detail and operation and is capable of being inexpensively and quickly manufactured.

In Figure 3 it is believed apparent that the cleaner may be effectively employed to clean right angled corners in the basin as well as rounded bottoms, the opening and closing movement of the scoops being easily effected by means of the operator rod 20. Furthermore, by means of the adjustable connection between the lever 30 and the rod 20, the degree of opening movement of the scoops can be regulated within fine limits. Additionally, the mode of attachment of each scoop element to the handle 11, namely the arms 18 and 19, insures that the scoop elements are free from any protuberances, etc., thus insuring that matter cannot collect between the scoop elements and the arms to hinder efficient operation of the scoop elements.

This invention is not to be confined to any strict conformity with the showing in the drawing but may be changed or modified so long as such changes or modifications mark no material departure from the salient features of the invention as expressed in the appended claim.

I claim:

A cleaner for catch basins and the like comprising a handle element, a pair of complemental scoop sections pivotally connected to one end of the handle for movement about a horizontal axis, an operator member supported for longitudinal sliding movement with respect to the handle element, an elongated rod pivotally connected at one end to each of said scoop sections and extending upwardly in converging relation, a common pivot connection between the upper ends of the converging rods and the operator member, said common pivot connection being in line with the pivot connection between the handle element and the scoop sections, an elongated lever, a pivot connection between one end of the lever and the handle element and an adjustable pivot connection intermediate the ends of the elongated lever to the operator member, said elongated lever serving for moving said operator member relative to the handle element so that movement of the operator member away from the scoop sections displaces the pivot connections between the rods and the scoop sections upwardly to open the scoop sections while movement of the operator member in the opposite direction displaces the pivot connections downwardly to close the scoop sections.

References Cited in the file of this patent

UNITED STATES PATENTS

| | | |
|---|---|---|
| 390,049 | White | Sept. 25, 1888 |
| 1,187,316 | Higby | June 13, 1916 |
| 1,390,120 | Lambert | Nov. 23, 1920 |
| 1,888,929 | McDowell | Nov. 22, 1932 |
| 2,230,498 | Loos et al. | Feb. 4, 1941 |
| 2,435,473 | Sonnenberg | Feb. 3, 1948 |